Feb. 3, 1970    J. H. ELLINGER    3,492,887
GEAR

Filed Aug. 5, 1968    3 Sheets-Sheet 1

Inventor
JOHN HENRY ELLINGER

By
Cushman Darby & Cushman
Attorneys

Feb. 3, 1970  J. H. ELLINGER  3,492,887

GEAR

Filed Aug. 5, 1968  3 Sheets-Sheet 2

Inventor
JOHN HENRY ELLINGER

By
Cushman, Darby & Cushman
Attorneys

Feb. 3, 1970     J. H. ELLINGER     3,492,887

GEAR

Filed Aug. 5, 1968     3 Sheets-Sheet 3

Inventor
JOHN HENRY ELLINGER

By
Cushman, Darby & Cushman
Attorneys

United States Patent Office 3,492,887
Patented Feb. 3, 1970

3,492,887
GEAR
John H. Ellinger, Mickleover, Derby, England, assignor to Rolls-Royce Limited, Derby, England, a British company
Filed Aug. 5, 1968, Ser. No. 750,361
Claims priority, application Great Britain, Aug. 12, 1967, 37,147/67
Int. Cl. F16h 55/10
U.S. Cl. 74—450        23 Claims

ABSTRACT OF THE DISCLOSURE

A gear is enabled to have a number of teeth which can be slightly varied. This is effective by dividing the toothed annulus by a split or splits which divides at least one tooth into two or more parts. Actuating means is provided to open or close the splits so that the tooth parts either line up to form a complete tooth or teeth or they are separated to form a plurality of part teeth.

---

This invention relates to a gear.

In certain gear mechanism it is sometimes desirable to vary the number of teeth on one of the gears of the mechanism. This is particularly so in the case of differential gear mechanisms where the output of the mechanism depends upon a small differential speed between two gears. In such cases it may be possible to reverse the direction of the outputs by a minor change in the number of teeth in a particular gear, without resorting to the use of clutches and sliding pinions. One example of a mechanism where such a reversal may be achieved is described in my co-pending application No. 29,245/67.

According to the present invention a gear comprises a toothed, split annulus, each said split dividing at least one said tooth into a plurality of tooth portions, and actuating means whereby said split may be opened or closed between two positions, in one of which said portions correspond to form a single tooth while in the other of which said portions are displaced relative to one another to form two teeth of reduced width.

Preferably each split so divides a plurality of teeth, and said actuating means may be adapted to further open said split to form further teeth of reduced width.

Each said split may divide each said tooth into a pair of outer portions and a relatively movable inner portion. Thus the split may take the form of a single rectangular castellation extending through said teeth.

Said annulus is preferably supported from a further load-bearing annulus. The support means between the split annulus and the further load-bearing annulus may comprise a plurality of leaf spring members lying substantially tangential to the outer periphery of said split annulus, and there may be further spring means between said split annulus and said further load-bearing annulus to take teeth loads. Thus said further spring means may comprise a plurality of tubular rollers lying between the split annulus and said further load-bearing annulus.

Said rollers may extend parallel to the axis of said split annulus and may engage in indentations in the outer surface of said split annulus. The rollers may be retained by a retaining ring. Stops may be provided to support said split annulus directly from said load-bearing annulus in one position of the split.

In one embodiment of the invention said split annulus is split into three portions by three said splits.

Said actuating means may comprise a shaft extending through one part of said split annulus and carrying a cam which operates upon the other part of said split annulus.

Figure 1:
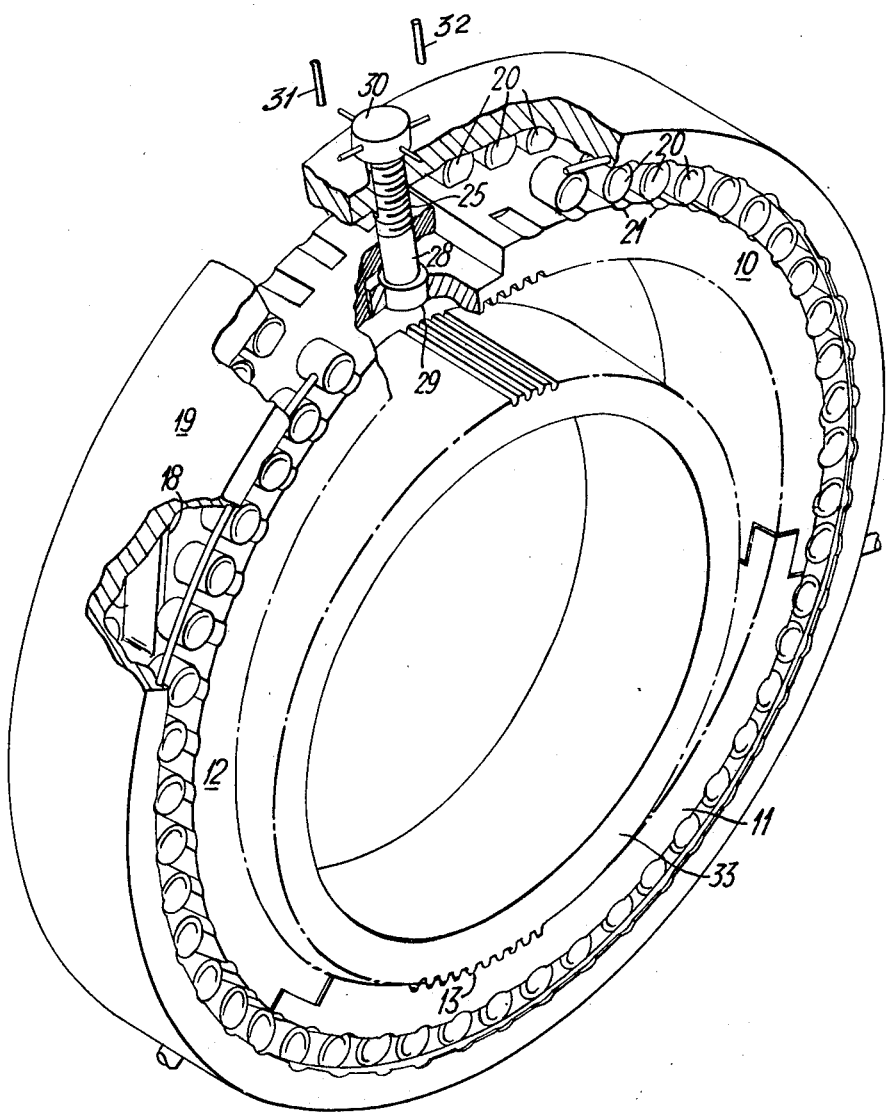
Figure 2:
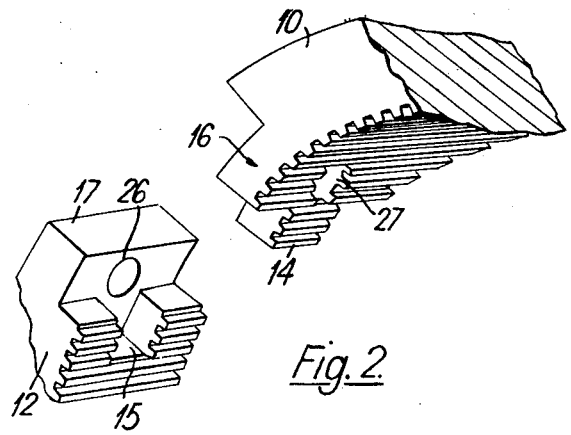
Figure 3:
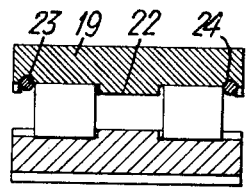
Figure 5:
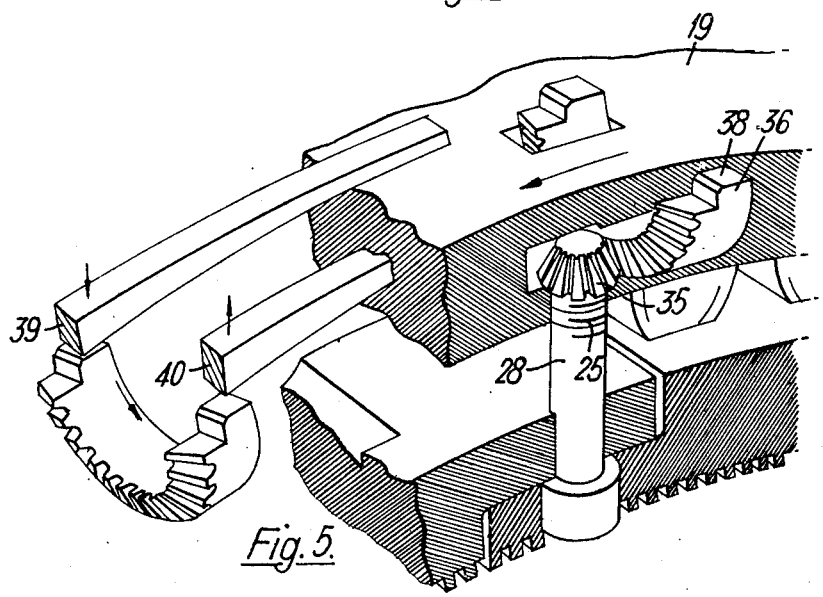
Figure 4:
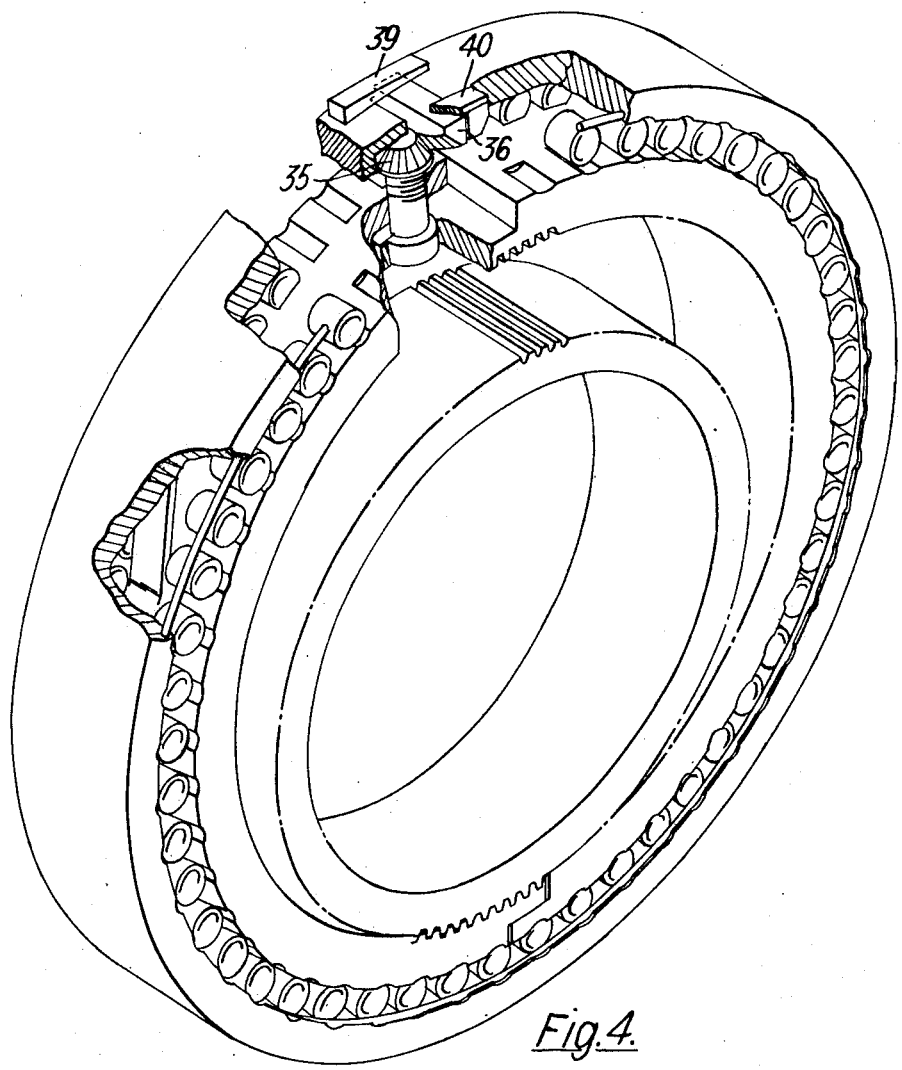

The invention will now be described merely by way of example with reference to the accompanying drawings in which:

FIGURE 1 is a perspective and partly broken away view of an internally toothed gear according to the invention together with an eccentric gear meshing with the internal gear, FIGURE 2 is an exploded perspective view of part of the internal gear of FIGURE 1, FIGURE 3 is a section through the internal gear of FIGURE 1, FIGURE 4 is a view similar to FIGURE 1 but of a further embodiment and FIGURE 5 is an enlarged perspective view of the actuating mechanism of the embodiment of FIGURE 4.

Referring to FIGURE 1 the internal gear consists of three arcuate sections 10, 11 and 12 which combine to form a split annulus. Each of the sections 10, 11, 12 is provided with internal teeth as can be seen at 13 and is visible from FIGURE 2 which shows adjacent portions of the sections 10 and 12.

The split between each pair of sections is most easily visible in FIGURES 1 and 2 and it can be seen that the section 10 is formed with a rectangular projection 14 which carries the central portion of three gear teeth. The section 12 is formed with a corresponding rectangular indentation 15 which is so shaped as to enable the projection 14 to fit within it. That part of the section 12 which is partly cut away by the indentation 15 carries the end portions of three teeth on its inner surface, these end portions being divided by the indentation 15. It will be seen that when the projection 14 fits within the indentation 15 the tooth portions on the projection correspond with the tooth portions on the cut away part of the section 12 to form three complete teeth which form a continuation of the internal gear.

It will be noted that in fact the split between the sections 10 and 12, and similarly the splits between sections 10 and 11 and 11 and 12, takes the form of a rectangular castellation extending through the teeth.

In order to provide some radial location of the sections 10 and 12 the section 10 is cut away at 16 to form an axially extending step in its outer surface. The section 12 is provided with a corresponding axially extending projection 17 which fits in the step 16 and overlaps the projecting portion of the section 10.

In order to retain the three sections 10, 11 and 12 in an annular formation each section has a leaf spring 18 which extends substantially tangentially from its outer periphery and is connected to an outer load bearing annulus 19. The leaf springs 18 are sufficient flexible to allow radial movement of the sections 10, 11 and 12. Such radial movement will be accompanied by circumferential movement, but since all three leaf springs extend in the same sense, the circumferential motion of all three sections will be in the same direction.

In order to take tooth loads from the sections 10, 11 and 12 to the load bearing annulus 19 a series of tubular springs 20 are provided. These springs form two rows one of which lies at each axial extremity of the ring 19. The tubular springs seat in a series of depressions 21 formed in the outer circumference of each of the sections 10, 11 and 12 and rest on the cylindrical interior surface of the annulus 19. The rollers extend axially and in order to prevent the rollers being axially displaced they abut against an internally projecting ring 22 on the inside of the annulus 19 and at opposite ends are retained by a pair of retaining rings 23 and 24 which seat in grooves in the internal periphery of the annulus 19.

In order to actuate movement of the sections 10, 11 and 12 relative to one another there are provided in the ring 19 three threaded holes 25. These holes are equally spaced apart round the periphery of the ring so that they line up with pairs of holes in the sections 10, 11 and 12 which pass through the sections adjacent to the split between the sections. One of these sets of holes can be seen in FIGURE 2 where it will be noted that hole 26 is provided in the projection 17 while the hole 27 is provided in the stepped portion of the section 10. When the projection 14 seats in the indentation 15 the holes 26 and 27 line up to form a single hole while the hole 25 also lines up with these holes.

Projecting through the hole 25 there is a threaded shaft 28 which carries at its radially innermost extremity a cam 29. At its radially outermost extremity the shaft 28 carries a capstan 30 which is arranged to be operated by one of two pins 31 and 32 which are mounted from fixed structure (not shown), the whole forming a drive of the cyclometer type.

The operation of the device is as follows. The internal gear ring meshes with an eccentric external toothed gear 33 and forms part of an epicyclic gear train having a certain gear ratio. In order to vary this gear ratio the effective number of teeth on the internal gear made up by the three sections 10, 11 and 12 is altered. This is effected by operating one of the pins 31 or 32 so that it can engage with the capstan 30. In this particular embodiment the ring 19 rotates with respect to the fixed structure carrying the pins 31 and 32. Therefore when one of these pins is arranged to engage with the capstan 30 it rotates the capstan and therefore rotates the shaft 28. The shaft 28 simultaneously moves radially inward by virtue of the screw thread 25 and also rotates the cam 29. The cam 29 seats in the hole 27 and is eccentric from the shaft 28 which seats in the hole 26 therefore rotation of the shaft causes the holes 26 and 27 to move relatively and therefore causes the sections 10 and 12 to move apart. Simultaneously the same operation occurs between the sections 10 and 11 and 11 and 12.

The consequent enlargement of the circumference of the ring formed by the sections 10, 11 and 12 causes an increase in its radius which would normally cause the shaft 28 and cam 29 to move out of their correct positions in the holes 26 and 27, however the screw thread 25 is arranged to compensate exactly for this radial enlargement.

The effect of separating the sections 10 and 12 is to pull the projection 14 away from the indentation 15. It is arranged that the movement of the cam 29 produces a movement of exactly one tooth pitch. Thus the projection 14 moves away from the indentation 15 by exactly one tooth pitch. This has the effect of causing the central tooth portion on the projection 14 which corresponded with the tooth portions nearest the closed end of the indentation 15 to move so that it corresponds with the next pair of tooth portions separated by the indentation 15. This leaves the first abovementioned pair of tooth portions without any central portion.

The tooth portion on the projection 14 nearest the remainder of the section 10 moves out from between the end tooth portions on the section 12 and is left without any surrounding tooth portions. In this way two part teeth are formed, one of which has the end portions of the teeth but no centre while the other of which has one central portion but no ends. The teeth are designed so that this portion of the teeth will be sufficient to take the tooth loads due to normal running.

If the drive is such that the torque load is less with one number of teeth than with the alternative number, it is preferably arranged that the lower torque lead is taken by the gear when it has the additional, reduced width teeth.

Thus it will be seen that in this way the number of teeth on the gear may be increased by one tooth for each split and actuating mechanism; in this embodiment there are three splits and hence three extra teeth can effectively be provided.

In this particular embodiment the gear 33 meshes only in one section with the internal gear. By arranging that the point of meshing between the gear 33 and the respective one of the sections 10, 11 and 12, and the pins 32 are always diametrically opposed, it can be arranged that no movement of the actuation mechanism (the capstan 30, shaft 28 and cam 29) takes place while the teeth adjacent the split are under load.

It will be understood that with the above-described mechanism it is necessary to arrange that the pin 31 or 32 is only engaged with the capstan 30 for a rather short time, if the speed of relative rotation between the annulus 19 and fixed structure is at all great. It might therefore be preferable to arrange that the capstan 30 incorporates a spring drive mechanism whereby the drive from the pin 31 or 32 might produce only a specified movement of the shaft 28 then be freed.

The embodiment of FIGURE 4 is basically very similar to that of the preceding figures, and its construction is therefore not elaborated with the exception of these parts in which it differs from the previous construction. Firstly it will be noted that whereas the first embodiment has three splits in the internal gear, the embodiment of FIGURE 4 shows only two such splits, and the embodiment of FIGURE 4 is only enabled to vary the number of teeth by two.

This alteration occurs because in the particular embodiment of FIGURE 4 an increase of three teeth would lead to the teeth having to take too great loads under a condition of too little tooth engagement.

The second modification of the FIGURE 4 embodiment, which is not, however, visible from the drawings lies in the provision of stops which project from the load bearing annulus 19 radially inward from the surface between the two sets of rollers 20. These stops are so arranged that when the splits in the internal gear are in their expanded position, the segments of the internal gear rest upon the stops. In this way, the gear separating forces involved are transferred from the internal gear to the lead bearing annulus 19 by the stops rather than by the tubular springs 20. This removes a considerable limitation on the amount of minimum torque which can be carried by the arrangement, since it will be appreciated that the stops can be made of considerably greater strength than the tubular springs 20 when the annulus is fully expanded.

The third and final modification of the embodiment of FIGURE 4 lies in the actuating mechanism for separating the splits and allowing them to close together again. In the embodiment of the previous figures the cam 29 is rotated by the action of a capstan 30 which is turned by impacts of the pins 31 and 32. This arrangement provides two serious limitations. Firstly the capstan and the pins and other operating mechanism must be of sufficient strength to take the impact loads which are involved and which are of considerable magnitude. Secondly it is necessary to arrange some sort of mechanism to retract the pins after they have performed the necessary turning of the capstan 30. This may be considerably difficult when the apparatus is rotating at high speed.

The actuating mechanism of embodiment of FIGURE 4 avoids these disadvantages. As can best be seen from FIGURE 5 the actual splitting mechanism is similar to that of the previous embodiments. Thus a shaft 28 again drives a cam 29, and the screw 25 is again adapted to cause the shaft and cam to move radially to follow the radial movement of the segments. In the present case the cam only moves the leading edge of the gear segment so that the segment is stationary while engaged with the external gear. In the present instance the shaft 28 carries at its radially outermost extremity a bevel wheel 35 which engages with a part-annular segment of bevel wheel 36 mounted for part-rotational movement within the load bearing annulus 19. The part annulus 36 has two ends 37 and 38 which project slightly above the outer periphery of the load bearing annulus 19.

In order to actuate the part annulus 36 a pair of cams 39 and 40 (parts of which are shown) are provided. The cams 39 and 40 are part annular and lie co-axial with the load bearing annulus. They are arranged to be housed in a position in which they both clear the ends 37 and 38 but are provided with hydraulic or mechanical actuation means (not shown) by which they can be caused to move radially inwards and hence engage with a respective one of the ends 37 and 38. The cams 39 and 40 taper circumferentially in section, being of relatively thin section at the end which first engages one of the ends 37 and 38 and being of relatively thick section at the most distant end. It will be appreciated that if one of the cams is actuated to move radially inward its thin section first engages with the relevant end of the part-circular bevel wheel 36, initially causing very little movement. As the respective end sweeps around the periphery of the cam it is gradually further depressed until at the end of the cam it is arranged to be depressed sufficiently to move the shaft 28 and cam 29 to one of the two operating positions.

It will also be appreciated that once the actuation of the cam 39 and 40 has caused the bevel wheel 36 to rotate the shaft 28 to one of these positions there is no necessity to arrange for a retraction of the cam until it is required to rotate the shaft to its other operational position.

When it is required to rotate the shaft to its alternative position, the other cam may be actuated inward while the initially actuated cam is either actively withdrawn by its actuating mechanism or is merely allowed to be pushed into its withdrawn position by reaction upon its respective end of the part-annulus 36.

It will be appreciated that this construction allows a relatively simple actuation mechanism to be used for the cams and since actual movement of the part-annulus 36 takes place over half a complete revolution, this actuation is relatively gradual and does not involve impact loads and the necessary strong structure to withstand such loads.

The length of the cams is chosen to be as large as possible while allowing the necessary engagement of the teeth. Thus this can be 180° minus twice the number of teeth engaged, i.e. 180° − (4–6 teeth).

It will be noted that by arranging that the tubular springs 20 have high stiffness in relation to the tooth loads, it is possible to make the sections 10, 11 and 12 relatively flexible so that they can easily deform to maintain the circular shaping of the internally toothed gear under the various different conditions of the actuating mechanism and hence the various splits. The tubular springs are useful in that they have large stiffness for small deflections and in that they also operate in a similar fashion to a roller bearing and allow the small circumferential movements of the sections which take place when the change in the number of teeth is taking place.

It will be understood that by varying the dimensions of the cam 29 and the split between the sections the amount of variation of the number of teeth can be altered. The actual variation in the number of teeth is only limited by the amount of deformation of the various sections which can take place, and generally this variation should be a small proportion of the total number of teeth.

It will be noted that the above embodiment shows an internally toothed gear the number of whose teeth may be varied. It will be evident that the same principle can be applied to an externally toothed gear or even a gear having axially facing teeth such as a bevel wheel or the like.

I claim:

1. A gear comprising a toothed split annulus, each said split dividing at least one said tooth into a plurality of tooth portions, and actuating means adapted to open or close said split between two positions, in one of which said portions correspond to form a single tooth while in the other of which said portions are displaced relative to one another to form two teeth of reduced width.

2. A gear as claimed in claim 1 and in which each said split divides a plurality of teeth.

3. A gear as claimed in claim 2 and in which said actuating means are adapted to further open each said split to form further teeth of reduced width.

4. A gear as claimed in claim 1 and in which there is an eccentric gear wheel, said split annulus being internally toothed and adapted to mesh internally with the eccentric gear wheel, said actuating mechanism being adapted to operate only when said gear wheel meshes with said split annulus at a point distant from the respective split.

5. A gear as claimed in claim 1 and in which there is an eccentric gear wheel, said split annulus being internally toothed and adapted to mesh internally with the eccentric gear wheel, said actuating means being adapted to move only the segment of the annulus which is disengaged from said gear wheel at the time of movement.

6. A gear as claimed in claim 1 and in which there is a further load bearing annulus from which said split annulus is supported.

7. A gear as claimed in claim 6 and in which there is a plurality of leaf spring members lying substantially tangential to the outer periphery of said split annulus by which leaf springs said split annulus is retained to said load bearing annulus.

8. A gear as claimed in claim 6 and in which spring means are provided between said split annulus and said load bearing annulus to transmit tooth loads.

9. A gear as claimed in claim 8 and in which said spring means comprises a plurality of tubular rollers lying between the split annulus and the load bearing annulus.

10. A gear as claimed in claim 9 and in which there are indentations on the outer surface of said split annulus, said rollers extending parallel to the axis of said split annulus and engaging in the indentations.

11. A gear as claimed in claim 10 and in which there is a groove in the inner surface of said load bearing annulus and a retaining ring which engages in the groove and which retains said rollers.

12. A gear as claimed in claim 6 and in which there are rigid stops by which said split annulus is supported from said load bearing annulus in one position of said split.

13. A gear is claimed in claim 12 and in which said split annulus is inside said load-bearing annulus and is supported on said stops when said split or splits is or are in their opened position.

14. A gear as claimed in claim 1 and in which each said split divides each said tooth into a pair of outer portions and a relatively movable inner portion.

15. A gear as claimed in claim 14 and in which each said split takes the form of a single rectangular castellation extending through said teeth.

16. A gear as claimed in claim 1 and in which said actuating means comprises a shaft extending through one part of said split annulus and carrying a cam which operates on the other part of said split annulus.

17. A gear as claimed in claim 16 and in which said shaft is screwed so that on rotation of the shaft to operate the cam the cam and shaft move radially so that they follow the radial motion of the respective split annulus consequent upon the opening or closing of the split.

18. A gear as claimed in claim 17 and in which said shaft is adapted to be rotated by a cyclometer drive.

19. A gear as claimed in claim 18 and in which said cyclometer drive is effected by a pin or pins which are adapted to engage with a capstan on said shaft.

20. A gear as claimed in claim 19 and in which said pins are adapted to be engaged or disengaged with said capstan at will.

21. A gear as claimed in claim 16 and in which said shaft comprises a bevel pinion at its extremity distant from said cam, a bevel wheel segment which engages with said pinion, and a pair of cams each adapted to rotate said bevel wheel in one direction.

22. A gear as claimed in claim 21 and in which said segment is mounted for rotation about an axis substantially tangential to said load bearing annulus, and said pair of cams part-annular and extend around part of the periphery of the load-bearing annulus.

23. A gear as claimed in claim 22 and comprising actuator means operable to move each of said pair of cams separately radially inwards to engage with said segment.

References Cited

UNITED STATES PATENTS

| 1,540,096 | 6/1925 | West | 74—450 |
| 2,399,122 | 4/1946 | Johnson | 74—446 |
| 2,493,106 | 1/1950 | Burton | 74—448 |
| 3,082,637 | 3/1963 | Paxton | 74—243 |
| 3,159,047 | 12/1964 | Dable | 74—450 |

ARTHUR T. McKEON, Primary Examiner

U.S. Cl. X.R.

74—243, 640, 804